(12) United States Patent
Hashimoto

(10) Patent No.: US 9,354,427 B2
(45) Date of Patent: May 31, 2016

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 14/483,304

(22) Filed: Sep. 11, 2014

(65) Prior Publication Data

US 2015/0177489 A1 Jun. 25, 2015

(30) Foreign Application Priority Data

Dec. 25, 2013 (JP) .................................. 2013-266442

(51) Int. Cl.
| | |
|---|---|
| G02B 3/02 | (2006.01) |
| G02B 13/18 | (2006.01) |
| G02B 9/62 | (2006.01) |
| G02B 13/00 | (2006.01) |
| G02B 5/00 | (2006.01) |
| G02B 27/00 | (2006.01) |

(52) U.S. Cl.
CPC .............. *G02B 13/0045* (2013.01); *G02B 9/62* (2013.01); *G02B 5/005* (2013.01); *G02B 13/0015* (2013.01); *G02B 13/18* (2013.01); *G02B 27/0025* (2013.01)

(58) Field of Classification Search
CPC ...... G02B 13/0045; G02B 9/62; G02B 13/18; G02B 13/0015; G02B 27/0025; G02B 5/005
USPC .......................... 359/713, 738–740, 756, 757
See application file for complete search history.

(56) References Cited

U.S. PATENT DOCUMENTS

| | | | |
|---|---|---|---|
| 2014/0211325 A1 | 7/2014 | Lai | |
| 2015/0042862 A1* | 2/2015 | Huang | ................ H04N 5/2254 359/713 |

FOREIGN PATENT DOCUMENTS

| | | |
|---|---|---|
| JP | 2010-26434 A | 2/2010 |
| JP | 2011-85733 A | 4/2011 |

* cited by examiner

*Primary Examiner* — Evelyn A Lester
(74) *Attorney, Agent, or Firm* — Westerman, Hattori, Daniels & Adrian, LLP

(57) ABSTRACT

A compact low-cost imaging lens which provides brightness with an F-value of 2.5 or less and a wide field of view and corrects aberrations properly, meeting the demand for low-profileness. The imaging lens elements are arranged in the following order from an object side to an image side: a first lens with positive refractive power having a convex surface on the object side; a second lens with negative refractive power; a third lens with positive or negative refractive power having at least one aspheric surface; a fourth lens with positive refractive power; a fifth lens as a meniscus double-sided aspheric lens having a concave surface near an optical axis on the image side; and a sixth lens as a meniscus lens having a concave surface near the optical axis on the object side. The both surfaces of the fifth lens have pole-change points off the optical axis.

15 Claims, 12 Drawing Sheets

IMAGING LENS

The present application is based on and claims priority of Japanese patent application No. 2013-266442 filed on Dec. 25, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device, and more particularly to imaging lenses which are built in image pickup devices mounted in increasingly compact and low-profile smart phones and mobile phones, PDAs (Personal Digital Assistants), game consoles, information terminals such as PCs, and home appliances with a camera function.

2. Description of the Related Art

In recent years, there has been a general tendency that most information terminals have a camera function. Also, home appliances with a camera function have been introduced into the market; for example, a user who is away from home can see in real time what is going on at home, through the camera mounted in a home appliance by telecommunication between the home appliance and his/her smart phone. It is thought that products which enhance consumer convenience by adding a camera function to an information terminal or home appliance will be increasingly developed in the future. In addition, the camera mounted in such a product is expected to not only provide high resolution to cope with an increase in the number of pixels but also be compact and low-profile and provide high brightness and a wide field of view. In particular, the imaging lens to be built in a mobile terminal is strongly expected to be low-profile enough to be applicable to a low-profile product.

However, in order to provide a low-profile imaging lens with a wide field of view and high brightness as described above, the following problem has to be addressed: difficulty in correcting aberrations in the peripheral area of the image and ensuring high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses an imaging lens composed of five constituent lenses, which includes, in order from an object side, a positive first lens, a positive second lens, a negative third lens, a positive fourth lens, and a negative fifth lens and features compactness and high brightness with an F-value of about 2 and corrects various aberrations properly.

Patent Document 2 discloses an imaging lens which includes a first lens group including a first lens having a convex surface on an object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This imaging lens is intended to realize a compact lens system with high resolution.

The imaging lens described in Patent Document 1, composed of five constituent lenses, corrects various aberrations properly and provides high brightness with an F-value of about 2.0 to about 2.5; however, its total track length is longer than the diagonal length of the effective imaging plane of the image sensor, bringing about a disadvantage in making the imaging lens low-profile. Furthermore, if this lens configuration is designed to provide a wide field of view, it will be difficult to correct aberrations in the peripheral area of the image properly.

The imaging lens described in Patent Document 2 has a lens system which is relatively low-profile and able to correct aberrations properly. However, in order to ensure brightness with an F-value of 2.8 or less and a field of view of 65 degrees or more, the problem of difficulty in correcting aberrations in the peripheral area of the image must be addressed.

As stated above, in conventional technology, it is difficult to provide a low-profile imaging lens with a wide field of view which provides high brightness and high resolution.

SUMMARY OF THE INVENTION

The present invention has been made in view of the above problem, and an object thereof is to provide a compact low-cost imaging lens which meets the demand for low-profileness in spite of an increase in the number of constituent lenses and offers high brightness with an F-value of 2.5 or less and a wide field of view and corrects various aberrations properly.

Here, the term "low-profile" implies that the total track length is shorter than the diagonal length of the effective imaging plane of the image sensor, and the term "wide field of view" implies that the field of view is 70 degrees or more. The diagonal length of the effective imaging plane of the image sensor is twice the maximum image height, in which the maximum image height means the vertical height from an optical axis to the position where a light ray incident on the imaging lens at a maximum field of view enters the image plane.

According to one aspect of the present invention, there is provided an imaging lens which forms an image of an object on a solid-state image sensor, in which elements are arranged in the following order from an object side to an image side: a first lens with positive refractive power having a convex surface on the object side; a second lens with negative refractive power; a third lens with positive or negative refractive power having at least one aspheric surface; a fourth lens with positive refractive power; a fifth lens as a meniscus double-sided aspheric lens having a concave surface near an optical axis on the image side; and a sixth lens as a meniscus lens having a concave surface near the optical axis on the object side. The both surfaces of the fifth lens have pole-change points off the optical axis.

In the imaging lens with the above configuration, the first lens and the fourth lens have relatively strong positive refractive power to offer a low-profile design. The second lens with negative refractive power properly corrects spherical aberrations and chromatic aberrations which occur on the first lens. The third lens with positive or negative refractive power, having at least one aspheric surface, corrects axial chromatic aberrations, high-order spherical aberrations, coma aberrations, and field curvature properly. In the fifth lens, the both surfaces are aspheric surfaces having pole-change points off the optical axis so that the shape of its image-side surface changes from a concave shape near the optical axis to a convex shape at the lens periphery and the shape of its object-side surface changes from a convex shape near the optical axis to a concave shape at the lens periphery. Therefore, the fifth lens corrects field curvature in the image peripheral area, corrects distortion, and properly controls the angle of a chief ray incident on the image sensor from the image center to the image peripheral area. The sixth lens is responsible for the final correction of field curvature, distortion and the incidence angle of a chief ray. A "pole-change point" here means a point on an aspheric surface at which a tangential plane intersects the optical axis perpendicularly.

When the above configuration is adopted and refractive power is appropriately distributed to the constituent lenses, the imaging lens can be a low-profile high-performance imaging lens. Since all the constituent lenses are located with an air gap from an adjacent element, a relatively large number of aspheric surfaces can be used, thereby making it easier to realize an imaging lens which corrects aberrations properly.

Preferably, the imaging lens according to the present invention satisfies a conditional expression (1) below:

$$0.5 < f1/f < 1.5 \quad (1)$$

where
f: focal length of the overall optical system of the imaging lens
f1: focal length of the first lens.

The conditional expression (1) defines an appropriate range for the ratio of the focal length of the first lens to the focal length of the overall optical system of the imaging lens, and indicates a condition to offer a low-profile design and suppress spherical aberrations attributable to a low F-value and a wide field of view. If the value is above the upper limit of the conditional expression (1), the refractive power of the first lens would be too weak to offer a low-profile design. On the other hand, if the value is below the lower limit of the conditional expression (1), the refractive power of the first lens would be too strong to suppress high-order spherical aberrations.

More preferably, the imaging lens satisfies a conditional expression (1a) below:

$$0.5 < f1/f < 1.20. \quad (1a)$$

Preferably, the imaging lens according to the present invention satisfies a conditional expression (2) below:

$$-2.0 < f2/f < -0.5 \quad (2)$$

where
f: focal length of the overall optical system of the imaging lens
f2: focal length of the second lens.

The conditional expression (2) defines an appropriate range for the ratio of the focal length of the second lens to the focal length of the overall optical system of the imaging lens, and indicates a condition to offer a low-profile design and properly correct chromatic aberrations and other various aberrations attributable to a low F-value and a wide field of view. If the value is above the upper limit of the conditional expression (2), the negative refractive power of the second lens would be too strong to offer a low-profile design and make it difficult to correct coma aberrations and distortion in the peripheral portion. On the other hand, if the value is below the lower limit of the conditional expression (2), the negative refractive power of the second lens would be too weak to correct axial chromatic aberrations.

More preferably, the imaging lens satisfies a conditional expression (2a) below:

$$-1.5 < f2/f < -0.8. \quad (2a)$$

Preferably, the imaging lens according to the present invention satisfies a conditional expression (3) below:

$$0.3 < f4/f < 1.0 \quad (3)$$

where
f: focal length of the overall optical system of the imaging lens
f4: focal length of the fourth lens.

The conditional expression (3) defines an appropriate range for the ratio of the focal length of the fourth lens to the focal length of the overall optical system of the imaging lens, and indicates a condition to offer a low-profile design and correct spherical aberrations and coma aberrations properly. If the value is above the upper limit of the conditional expression (3), the positive refractive power of the fourth lens would be too weak to offer a low-profile design though it would be advantageous in correcting spherical aberrations and coma aberrations. On the other hand, if the value is below the lower limit of the conditional expression (3), the refractive power of the fourth lens would be too strong to correct spherical aberrations and coma aberrations though it would be advantageous in offering a low-profile design.

More preferably, the imaging lens satisfies a conditional expression (3a) below:

$$0.4 < f4/f < 1.0. \quad (3a)$$

Preferably, in the imaging lens according to the present invention, the fifth lens has negative refractive power, and a conditional expression (4) below is satisfied:

$$-1.5 < f5/f < -0.3 \quad (4)$$

where
f: focal length of the overall optical system of the imaging lens
f5: focal length of the fifth lens.

The conditional expression (4) defines an appropriate range for the ratio of the focal length of the fifth lens to the focal length of the overall optical system of the imaging lens, and indicates a condition to offer a low-profile design and correct various aberrations. If the value is above the upper limit of the conditional expression (4), the negative refractive power of the fifth lens would be too strong to offer a low-profile design and correct chromatic aberrations properly. On the other hand, if the value is below the lower limit of the conditional expression (4), the negative refractive power of the fifth lens would be too weak to correct coma aberrations and field curvature properly though it would be advantageous in offering a low-profile design.

More preferably, the imaging lens satisfies a conditional expression (4a) below:

$$-1.5 < f5/f < -0.5. \quad (4a)$$

Preferably, in the imaging lens according to the present invention, the sixth lens has negative refractive power, and a conditional expression (5) below is satisfied:

$$-3.0 < f6/f < -0.8 \quad (5)$$

where
f: focal length of the overall optical system of the imaging lens
f6: focal length of the sixth lens.

The conditional expression (5) defines an appropriate range for the ratio of the focal length of the sixth lens to the focal length of the overall optical system of the imaging lens, and indicates a condition to offer a low-profile design and correct various aberrations. If the value is above the upper limit of the conditional expression (5), the negative refractive power of the sixth lens would be too strong to offer a low-profile design. On the other hand, if the value is below the lower limit of the conditional expression (5), the negative refractive power of the sixth lens would be too weak to correct distortion and field curvature though it would be advantageous in offering a low-profile design.

More preferably, the imaging lens satisfies a conditional expression (5a) below:

$$-2.6 < f6/f < -1.0. \tag{5a}$$

Preferably, in the imaging lens according to the present invention, the third lens has a meniscus shape with a convex surface near the optical axis on the object side.

Since the third lens has a meniscus shape, field curvature can be corrected more effectively.

Preferably, the imaging lens according to the present invention satisfies a conditional expression (6) below:

$$0.3 < r4/f < 1.0 \tag{6}$$

where
f: focal length of the overall optical system of the imaging lens
r4: curvature radius of the image-side surface of the second lens.

The conditional expression (6) defines an appropriate range for the curvature radius of the image-side surface of the second lens with respect to the focal length of the overall optical system of the imaging lens, and indicates a condition to correct axial chromatic aberrations properly and suppress an increase in the manufacturing error sensitivity of the second lens. If the value is above the upper limit of the conditional expression (6), the negative refractive power of the image-side surface of the second lens would be too weak to correct chromatic aberrations. On the other hand, if the value is below the lower limit of the conditional expression (6), the negative refractive power of the image-side surface of the second lens would be too strong, resulting in an increase in manufacturing error sensitivity and making it difficult to maintain stable performance.

Preferably, the imaging lens according to the present invention satisfies conditional expressions (7) and (8) below:

$$20 < vd1 - vd2 < 50 \tag{7}$$

$$50 < vd3, vd4, vd5, vd6 < 80 \tag{8}$$

where
vd1: Abbe number of the first lens at d-ray
vd2: Abbe number of the second lens at d-ray
vd3: Abbe number of the third lens at d-ray
vd4: Abbe number of the fourth lens at d-ray
vd5: Abbe number of the fifth lens at d-ray
vd6: Abbe number of the sixth lens at d-ray.

The conditional expression (7) defines an appropriate range for the difference between the Abbe number of the first lens and the Abbe number of the second lens, and indicates a condition to correct chromatic aberrations properly. The conditional expression (8) defines an appropriate range for the Abbe number of each of the third lens to the sixth lens to enable the use of low-dispersion material in order to suppress chromatic aberrations of magnification. When plastic material which satisfies the conditional expressions (7) and (8) is adopted, the imaging lens can be manufactured at low cost.

Preferably, the imaging lens according to the present invention satisfies conditional expressions (9) and (10) below:

$$1.0 < (r9+r10)/(r9-r10) < 2.7 \tag{9}$$

$$-1.5 < (r11+r12)/(r11-r12) < -0.5 \tag{10}$$

where
r9: curvature radius of the object-side surface of the fifth lens r10: curvature radius of the image-side surface of the fifth lens
r11: curvature radius of the object-side surface of the sixth lens
r12: curvature radius of the image-side surface of the sixth lens.

The conditional expression (9) defines an appropriate range for the curvature radii of the fifth lens to determine the paraxial shape of the fifth lens, and indicates a condition to correct chromatic aberrations properly and suppress an increase in lens manufacturing error sensitivity. If the value is above the upper limit of the conditional expression (9), the negative refractive power of the fifth lens would be too weak to correct chromatic aberrations. On the other hand, if the value is below the lower limit of the conditional expression (9), the refractive power of the image-side surface of the fifth lens would be too strong, undesirably resulting in an increase in manufacturing error sensitivity.

The conditional expression (10) defines an appropriate range for the curvature radii of the sixth lens to determine the paraxial shape of the sixth lens, and indicates a condition to correct chromatic aberrations and field curvature while keeping the imaging lens low-profile. If the value is above the upper limit of the conditional expression (10), the refractive power of the object-side surface of the sixth lens would be too strong to correct field curvature. On the other hand, if the value is below the lower limit of the conditional expression (10), the refractive power of the sixth lens would weaken, resulting in a tendency toward worsening of chromatic aberrations, though it would be advantageous in offering a low-profile design.

More preferably, the imaging lens satisfies conditional expressions (9a) and (10a) below:

$$1.4 < (r9+r10)/(r9-r10) < 2.5 \tag{9a}$$

$$-1.3 < (r11+r12)/(r11-r12) < -0.8. \tag{10a}$$

Preferably, the imaging lens according to the present invention satisfies a conditional expression (11) below:

$$0.3 < f4/f1 < 1.5 \tag{11}$$

where
f1: focal length of the first lens
f4: focal length of the fourth lens.

The conditional expression (11) defines an appropriate range for the ratio of the focal length of the fourth lens to the focal length of the first lens, and indicates a condition to offer a low-profile design and provide a low F-value and a wide field of view. The positive refractive power of the fourth lens is controlled so that the first lens is not compelled to have excessively strong positive refractive power. By balancing the focal lengths of the two lenses within the range defined by the conditional expression (11), a low F-value and a wide field of view can be realized.

More preferably, the imaging lens satisfies a conditional expression (11a) below:

$$0.4 < f4/f1 < 1.1. \tag{11a}$$

DETAILED DESCRIPTION OF THE PREFERRED EMBODIMENTS

Hereinafter, the preferred embodiment of the present invention will be described in detail referring to the accompanying drawings. FIGS. 1, 3, 5, 7, 9, and 11 are schematic views showing the general configurations of the imaging lenses in Examples 1 to 6 according to this embodiment, respectively. Since all these examples have the same basic lens configuration, the general configuration of an imaging lens according to this embodiment is explained below referring to the schematic view of Example 1.

Figure 1:
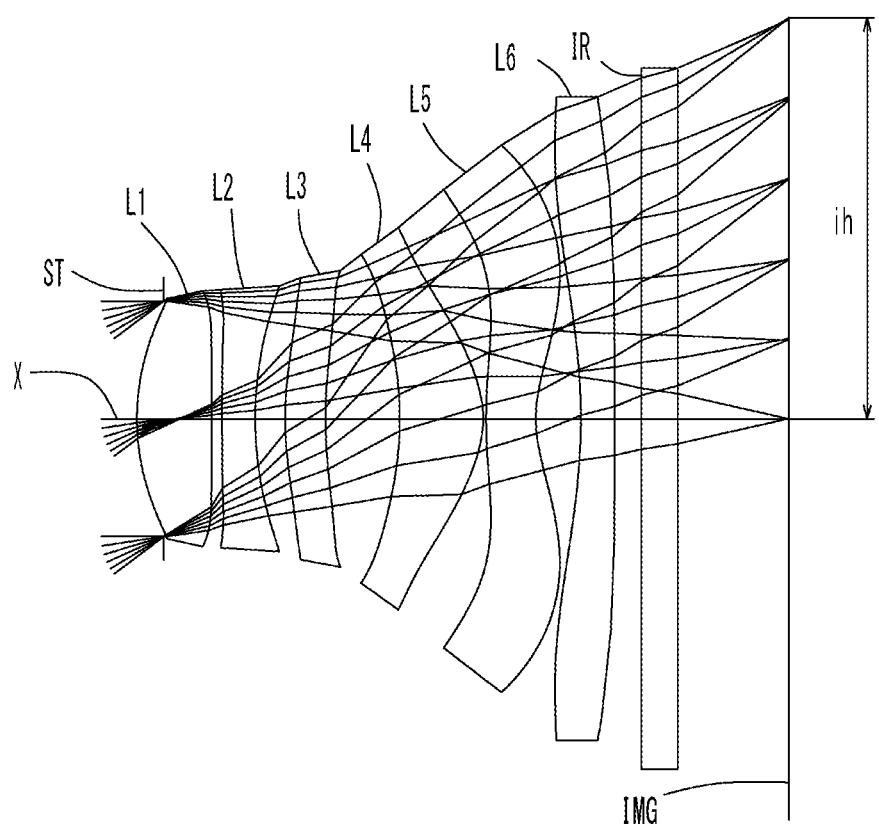
FIG. 1 is a schematic view showing the general configuration of an imaging lens in Example 1.

As shown in FIG. 1, the imaging lens according to the present invention includes, in order from an object side to an image side, a first lens L1 with positive refractive power having a convex surface on the object side, a second lens L2 with negative refractive power, a third lens L3 with positive or negative refractive power having at least one aspheric surface, a fourth lens L4 with positive refractive power, a fifth lens L5 as a meniscus double-sided aspheric lens having a concave surface near an optical axis X on the image side, and a sixth lens L6 as a meniscus lens having a concave surface near the optical axis X on the object side. The both aspheric surfaces of the fifth lens L5 have pole-change points off the optical axis X. An aperture stop ST is located on the object side of the first lens L1. A filter IR such as an infrared cut filter is located between the sixth lens L6 and an image plane IMG. The filter IR is omissible. In the present invention, total track length and back focus are each defined as a distance on the assumption that the filter IR is removed.

In the imaging lens with the above configuration, the first lens L1 and the fourth lens L4 have relatively strong positive refractive power to offer a low-profile design. The first lens L1 has a meniscus shape with a convex surface on the object side, and the fourth lens L4 has a meniscus shape with a convex surface on the image side. Alternatively, the first lens L1 may have a biconvex shape and in this case, the positive refractive power can be distributed to the both surfaces to suppress spherical aberrations effectively. The second lens L2, having negative refractive power, properly corrects spherical aberrations and chromatic aberrations which occur on the first lens L1. The third lens L3 has the weakest positive or negative refractive power among the constituent lenses of the imaging lens, and at least one aspheric surface thereof properly corrects axial chromatic aberrations, high-order spherical aberrations, coma aberrations, and field curvature. The fifth lens L5 has a meniscus shape with a concave surface near the optical axis X on the image side, and both its surfaces are aspheric surfaces having pole-change points off the optical axis X. Thus, the shape of the image-side surface of the fifth lens L5 changes from a concave shape near the optical axis X to a convex shape at the lens periphery, and the shape of its object-side surface changes from a convex shape near the optical axis X to a concave shape at the lens periphery. These aspheric surfaces correct field curvature in the image peripheral area, correct distortion, and properly control the angle of a chief ray incident on the image plane IMG from the image center to the image peripheral area. The sixth lens L6 is responsible for the final correction of field curvature, distortion and the incidence angle of a chief ray.

In order to enhance the telecentricity of the imaging lens and make the imaging lens low-profile, the aperture stop ST is located on the object side of the first lens L1. Specifically, it is located between the intersection of the object-side surface of the first lens L1 with the optical axis X and the periphery of the object-side surface of the first lens L1.

Since the third lens L3 has a meniscus shape with a convex surface near the optical axis X on the object side, field curvature is corrected more effectively.

When the above configuration is adopted and refractive power is appropriately distributed to the constituent lenses, the imaging lens can be a low-profile high-performance imaging lens with a low F-value and a wide field of view. All the constituent lenses are located with an air gap from an adjacent element. This means that all the constituent lens surfaces can be aspheric and thus it is easy to enhance the aberration correction effect by the use of aspheric surfaces.

The imaging lenses according to this embodiment satisfy conditional expressions (1) to (11) below:

$$0.5 < f1/f < 1.5 \tag{1}$$

$$-2.0 < f2/f < -0.5 \tag{2}$$

$$0.3 < f4/f < 1.0 \tag{3}$$

$$-1.5 < f5/f < -0.3 \tag{4}$$

$$-3.0 < f6/f < -0.8 \tag{5}$$

$$0.3 < r4/f < 1.0 \tag{6}$$

$$20 < vd1 - vd2 < 50 \tag{7}$$

$$50 < vd3, vd4, vd5, vd6 < 80 \tag{8}$$

$$1.0 < (r9+r10)/(r9-r10) < 2.7 \tag{9}$$

$$-1.5 < (r11+r12)/(r11-r12) < -0.5 \tag{10}$$

$$0.3 < f4/f1 < 1.5 \tag{11}$$

where f: focal length of the overall optical system of the imaging lens f1: focal length of the first lens L1 f2: focal length of the second lens L2 f4: focal length of the fourth lens L4 f5: focal length of the fifth lens L5 f6: focal length of the sixth lens L6 r4: curvature radius of the image-side surface of the second lens L2 vd1: Abbe number of the first lens L1 at d-ray vd2: Abbe number of the second lens L2 at d-ray vd3: Abbe number of the third lens L3 at d-ray vd4: Abbe number of the fourth lens L4 at d-ray vd5: Abbe number of the fifth lens L5 at d-ray vd6: Abbe number of the sixth lens L6 at d-ray r9: curvature radius of the object-side surface of the fifth lens L5 r10: curvature radius of the image-side surface of the fifth lens L5 r11: curvature radius of the object-side surface of the sixth lens L6 r12: curvature radius of the image-side surface of the sixth lens L6.

As for the refractive power of the first lens L1, when the conditional expression (1) is satisfied, the positive refractive power of the first lens L1 is in an appropriate range so as to offer a low-profile design and suppress spherical aberrations.

As for the refractive power of the second lens L2, when the conditional expression (2) is satisfied, the negative refractive power of the second lens L2 is in an appropriate range so as to offer a low-profile design and correct chromatic aberrations, and coma aberrations and distortion in the peripheral portion properly.

As for the refractive power of the fourth lens L4, when the conditional expression (3) is satisfied, the positive refractive power of the fourth lens L4 is in an appropriate range so as to offer a low-profile design and correct spherical aberrations and coma aberrations properly.

As for the refractive power of the fifth lens L5, when the conditional expression (4) is satisfied, the negative refractive power of the fifth lens L5 is in an appropriate range so as to offer a low-profile design and correct coma aberrations and field curvature properly.

As for the refractive power of the sixth lens L6, when the conditional expression (5) is satisfied, the negative refractive power of the sixth lens L6 is in an appropriate range so as to offer a low-profile design and correct distortion and field curvature properly.

As for the curvature radius of the image-side surface of the second lens L2, when the conditional expression (6) is satisfied, the curvature radius of the image-side surface of the second lens L2 with respect to the focal length of the overall optical system of the imaging lens is in an appropriate range so as to correct axial chromatic aberrations properly and suppress an increase in the manufacturing error sensitivity of the second lens L2.

As for the Abbe numbers of the first lens L1 and the second lens L2, when the conditional expression (7) is satisfied, the difference between the Abbe number of the first lens L1 and the Abbe number of the second lens L2 is in an appropriate range so as to correct chromatic aberrations properly.

As for the Abbe numbers of the third lens L3 to the sixth lens L6, when the conditional expression (8) is satisfied, low-dispersion material is used for the third lens L3 to the sixth lens L6, so it is easy to suppress chromatic aberrations of magnification.

By selecting plastic material which satisfies the conditional expressions (7) and (8), the imaging lens can be manufactured at low cost.

As for the paraxial shape of the fifth lens L5, when the conditional expression (9) is satisfied, chromatic aberrations are corrected properly and an increase in the manufacturing error sensitivity of the fifth lens L5 is suppressed.

As for the paraxial shape of the sixth lens L6, when the conditional expression (10) is satisfied, the imaging lens is kept low-profile and chromatic aberrations and field curvature are corrected properly.

As for the ratio of the focal length of the fourth lens L4 to the focal length of the first lens L1, when the conditional expression (11) is satisfied, the positive refractive power of the first lens L1 and the positive refractive power of the fourth lens L4 are appropriately balanced and the positive refractive power of the fourth lens L4 is controlled so that the positive refractive power of the first lens L1 is not compelled to be excessively strong. Thus, aberrations are suppressed, and the imaging lens can provide a low F-value and a wide field of view.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, TLA denotes total track length with the filter IR removed, and bf denotes back focus with the filter IR removed. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown in Table 1 below.

TABLE 1

Example 1
in mm
f = 3.03
Fno = 2.2
ω(°) = 37.0
ih = 2.30
TLA = 3.65
b f = 0.92

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.155 | | |
| 2* | 1.3421 | 0.428 | 1.544 | 55.57 |
| 3* | 27.1744 | 0.058 | | |
| 4* | 7.8700 | 0.190 | 1.635 | 23.91 |

TABLE 1-continued

Example 1
in mm
f = 3.03
Fno = 2.2
ω(°) = 37.0
ih = 2.30
TLA = 3.65
b f = 0.92

| | | | | |
|---|---|---|---|---|
| 5* | 1.8165 | 0.171 | | |
| 6* | 1.8016 | 0.231 | 1.535 | 56.16 |
| 7* | 2.6007 | 0.425 | | |
| 8* | −1.9249 | 0.477 | 1.544 | 55.57 |
| 9* | −0.6143 | 0.017 | | |
| 10* | 2.7974 | 0.285 | 1.535 | 56.16 |
| 11* | 0.7122 | 0.258 | | |
| 12* | −3.4643 | 0.195 | 1.535 | 56.16 |
| 13* | −89.9982 | 0.150 | | |
| 14 | Infinity | 0.210 | 1.517 | 64.20 |
| 15 | Infinity | 0.631 | | |
| Image Plane | Infinity | | | |

Constituent Lens Data

| Lens | Start Surface | Focal Length |
|---|---|---|
| 1 | 2 | 2.581 |
| 2 | 4 | −3.765 |
| 3 | 6 | 9.964 |
| 4 | 8 | 1.471 |
| 5 | 10 | −1.877 |
| 6 | 12 | −6.745 |

Aspheric Surface Data

| | 2nd Surface | 3rd Surface | 4th Surface | 5th Surface | 6th Surface | 7th Surface |
|---|---|---|---|---|---|---|
| k | 4.059E−01 | 0.000E+00 | 0.000E+00 | −1.901E+01 | 0.000E+00 | 0.000E+00 |
| A4 | −5.184E−02 | −3.080E−01 | −5.306E−01 | −1.049E−01 | −4.490E−01 | −1.814E−01 |
| A6 | 6.259E−02 | 1.952E+00 | 3.570E+00 | 1.608E+00 | 4.557E−01 | 1.438E−02 |
| A8 | −5.653E−01 | −7.994E+00 | −1.227E+01 | −4.242E+00 | −5.831E−01 | −2.130E−01 |
| A10 | 6.498E−01 | 1.798E+01 | 2.451E+01 | 6.137E+00 | 1.130E+00 | 4.676E−01 |
| A12 | 9.296E−01 | −2.561E+01 | −3.265E+01 | −6.943E+00 | −8.414E−01 | 0.000E+00 |
| A14 | −2.958E+00 | 1.557E+01 | 2.091E+01 | 4.411E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −4.452E+00 | 0.000E+00 | −8.959E+00 | 0.000E+00 | 0.000E+00 |
| A4 | 8.579E−02 | −2.844E−01 | −3.134E−01 | −2.230E−01 | 4.489E−02 | −6.882E−03 |
| A6 | 4.806E−02 | 3.402E−01 | 5.972E−02 | 1.048E−01 | −2.651E−03 | 0.000E+00 |
| A8 | −7.654E−02 | −1.496E−01 | 1.988E−02 | −4.726E−02 | −4.166E−05 | 0.000E+00 |
| A10 | −1.554E−01 | 1.020E−01 | −1.261E−02 | 1.489E−02 | −3.777E−05 | 0.000E+00 |
| A12 | 1.153E−01 | −6.663E−02 | 3.362E−03 | −2.397E−03 | 0.000E+00 | 0.000E+00 |
| A14 | 0.000E+00 | 7.988E−03 | −3.499E−04 | 6.854E−05 | 0.000E+00 | 0.000E+00 |
| A16 | 0.000E+00 | 0.000E+00 | 0.000E+00 | 0.000E+00 | 0.000E+00 | 0.000E+00 |

As shown in Table 2 below, the imaging lens in Example 1 satisfies all the conditional expressions (1) to (11).

TABLE 2

| | | |
|---|---|---|
| (1) $0.5 < f1/f < 1.5$ | | 0.85 |
| (2) $-2.0 < f2/f < -0.5$ | | −1.24 |
| (3) $0.3 < f4/f < 1.0$ | | 0.48 |
| (4) $-1.5 < f5/f < -0.3$ | | −0.62 |
| (5) $-3.0 < f6/f < -0.8$ | | −2.22 |
| (6) $0.3 < r4/f < 1.0$ | | 0.60 |
| (7) $20 < vd1 - vd2 < 50$ | | 31.66 |
| (8) $50 < vd3, vd4, vd5, vd6 < 80$ | vd3 | 56.16 |
| | vd4 | 55.57 |
| | vd5 | 56.16 |
| | vd6 | 56.16 |
| (9) $1.0 < (r9 + r10)/(r9 - r10) < 2.7$ | | 1.68 |
| (10) $-1.5 < (r11 + r12)/(r11 - r12) < -0.5$ | | −1.08 |
| (11) $0.3 < f4/f1 < 1.5$ | | 0.57 |

Figure 2:
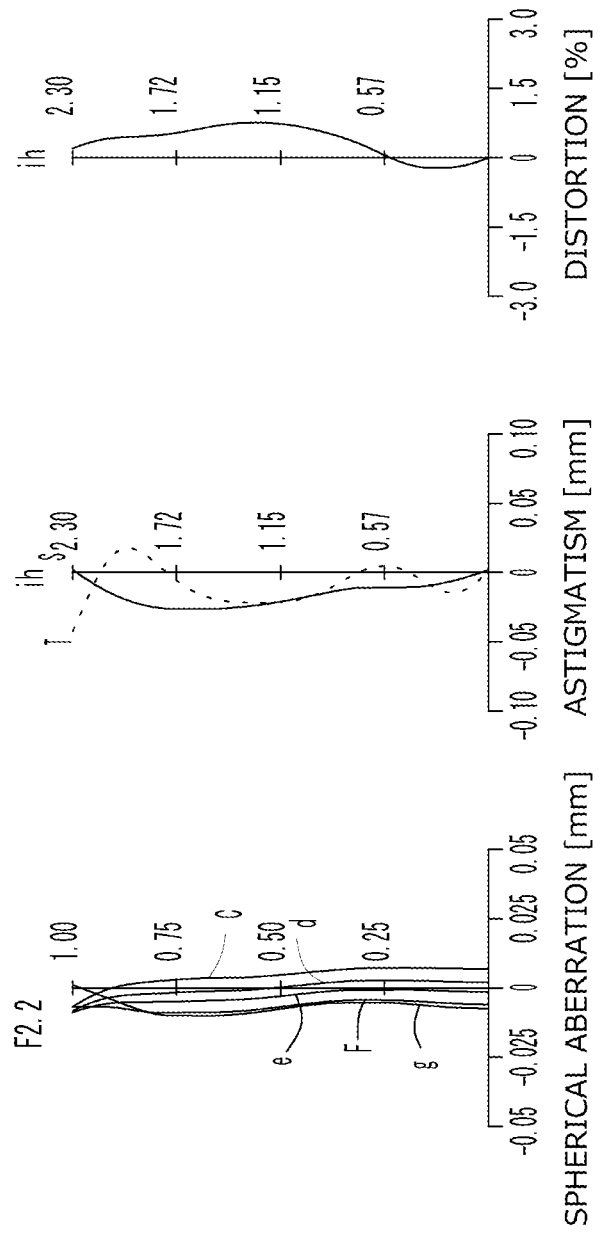
FIG. 2 shows spherical aberration, astigmatism, and distortion of the imaging lens in Example 1.
Figure 3:
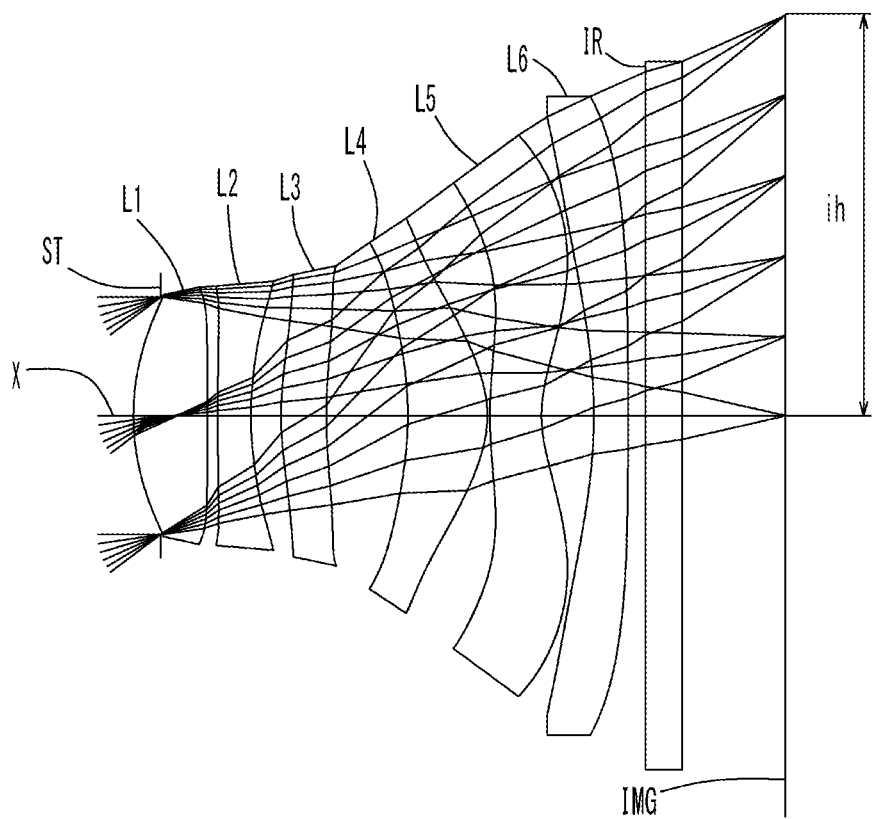
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, and 12). As shown in FIG. 2, each aberration is corrected properly.

In Example 1, total track length TLA is 3.65 mm and TLA/(2ih) is 0.795, which suggests that the imaging lens is low-profile though it uses six constituent lenses. Also, the imaging lens offers a wide field of view of 70 degrees or more and high brightness with an F-value of 2.2.

EXAMPLE 2

The basic lens data of Example 2 is shown in Table 3 below.

TABLE 3

Example 2
in mm
f = 3.04
Fno = 2.2
ω(°) = 37.0
ih = 2.30
TLA = 3.66
bf = 0.83

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.155 | | |
| 2* | 1.3712 | 0.423 | 1.544 | 55.57 |
| 3* | 49.1997 | 0.060 | | |
| 4* | 11.0752 | 0.190 | 1.635 | 23.91 |
| 5* | 1.8771 | 0.173 | | |
| 6* | 1.8465 | 0.259 | 1.535 | 56.16 |
| 7* | 3.0454 | 0.467 | | |
| 8* | −2.0561 | 0.456 | 1.544 | 55.57 |
| 9* | −0.6508 | 0.015 | | |
| 10* | 2.5948 | 0.294 | 1.535 | 56.16 |
| 11* | 0.7385 | 0.300 | | |
| 12* | −2.8905 | 0.195 | 1.535 | 56.16 |
| 13* | −90.0000 | 0.100 | | |
| 14 | Infinity | 0.210 | 1.517 | 64.20 |
| 15 | Infinity | 0.591 | | |
| Image Plane | Infinity | | | |

Constituent Lens Data

| Lens | Start Surface | Focal Length |
|---|---|---|
| 1 | 2 | 2.586 |
| 2 | 4 | −3.588 |
| 3 | 6 | 8.159 |
| 4 | 8 | 1.571 |
| 5 | 10 | −2.044 |
| 6 | 12 | −5.590 |

Aspheric Surface Data

| | 2nd Surface | 3rd Surface | 4th Surface | 5th Surface | 6th Surface | 7th Surface |
|---|---|---|---|---|---|---|
| k | 5.571E−01 | 0.000E+00 | 0.000E+00 | −2.084E+01 | 0.000E+00 | 0.000E+00 |
| A4 | −4.837E−02 | −2.804E−01 | −5.243E−01 | −1.318E−01 | −4.676E−01 | −1.808E−01 |
| A6 | 4.875E−02 | 1.987E+00 | 3.689E+00 | 1.604E+00 | 4.493E−01 | −8.288E−03 |
| A8 | −6.311E−01 | −7.920E+00 | −1.225E+01 | −4.081E+00 | −6.092E−01 | −2.339E−01 |
| A10 | 8.322E−01 | 1.780E+01 | 2.420E+01 | 5.876E+00 | 1.121E+00 | 4.838E−01 |
| A12 | 9.253E−01 | −2.560E+01 | −3.265E+01 | −6.945E+00 | −8.324E−01 | 0.000E+00 |
| A14 | −2.960E+00 | 1.558E+01 | 2.091E+01 | 4.410E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −4.522E+00 | 0.000E+00 | −8.535E+00 | 0.000E+00 | 0.000E+00 |
| A4 | 1.167E−01 | −2.441E−01 | −3.291E−01 | −2.069E−01 | 5.831E−02 | −1.760E−02 |
| A6 | 7.914E−05 | 3.403E−01 | 7.882E−02 | 1.020E−01 | −8.707E−03 | 2.740E−03 |
| A8 | −4.749E−02 | −1.683E−01 | 2.119E−02 | −4.357E−02 | −4.684E−04 | −9.983E−04 |
| A10 | −1.382E−01 | 9.569E−02 | −1.331E−02 | 1.414E−02 | 2.170E−04 | 5.743E−05 |
| A12 | 1.045E−01 | −6.569E−02 | 3.003E−03 | −3.037E−03 | 0.000E+00 | 0.000E+00 |
| A14 | 0.000E+00 | 1.404E−02 | −8.969E−04 | 2.777E−04 | 0.000E+00 | 0.000E+00 |
| A16 | 0.000E+00 | 0.000E+00 | 0.000E+00 | 0.000E+00 | 0.000E+00 | 0.000E+00 |

As shown in Table 4 below, the imaging lens in Example 2 satisfies all the conditional expressions (1) to (11).

TABLE 4

| | | |
|---|---|---|
| (1) $0.5 < f1/f < 1.5$ | | 0.85 |
| (2) $-2.0 < f2/f < -0.5$ | | -1.18 |
| (3) $0.3 < f4/f < 1.0$ | | 0.52 |
| (4) $-1.5 < f5/f < -0.3$ | | -0.67 |
| (5) $-3.0 < f6/f < -0.8$ | | -1.84 |
| (6) $0.3 < r4/f < 1.0$ | | 0.62 |
| (7) $20 < vd1 - vd2 < 50$ | | 31.66 |
| (8) $50 < vd3, vd4, vd5, vd6 < 80$ | vd3 | 56.16 |
| | vd4 | 55.57 |
| | vd5 | 56.16 |
| | vd6 | 56.16 |

TABLE 4-continued

| | |
|---|---|
| (9) $1.0 < (r9 + r10)/(r9 - r10) < 2.7$ | 1.80 |
| (10) $-1.5 < (r11 + r12)/(r11 - r12) < -0.5$ | -1.07 |
| (11) $0.3 < f4/f1 < 1.5$ | 0.61 |

Figure 4:
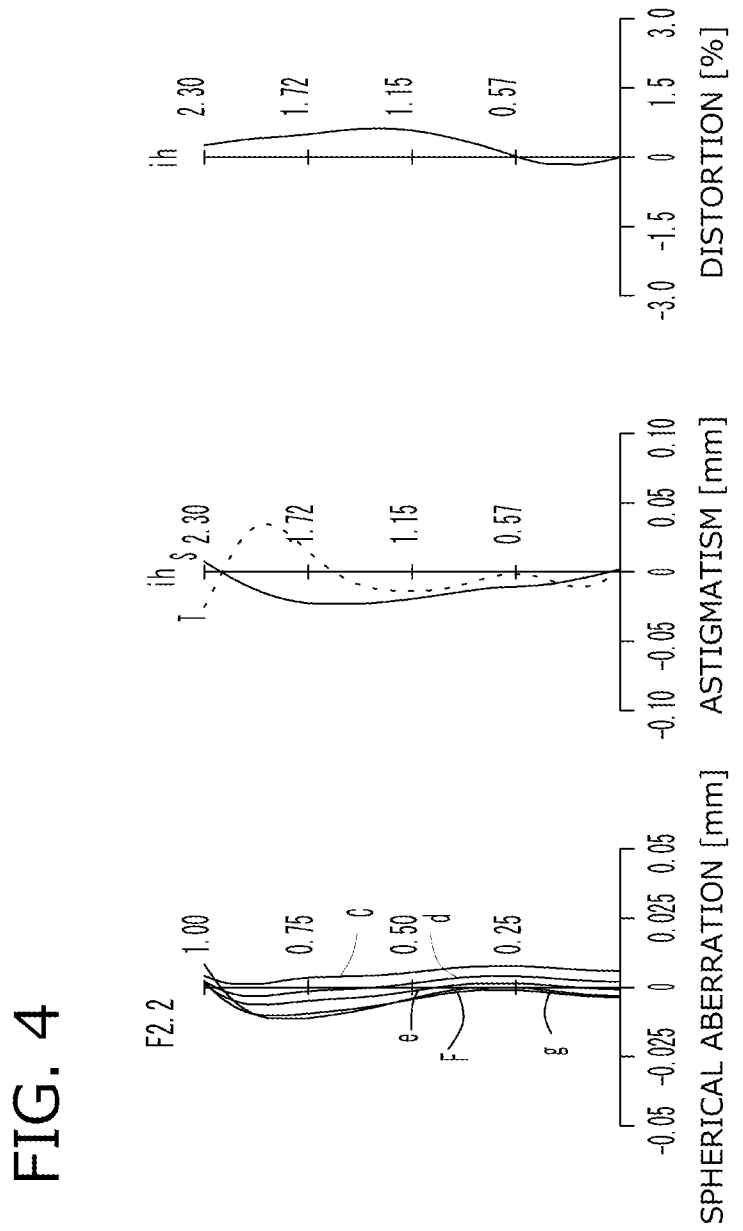
FIG. 4 shows spherical aberration, astigmatism, and distortion of the imaging lens in Example 2.
Figure 5:
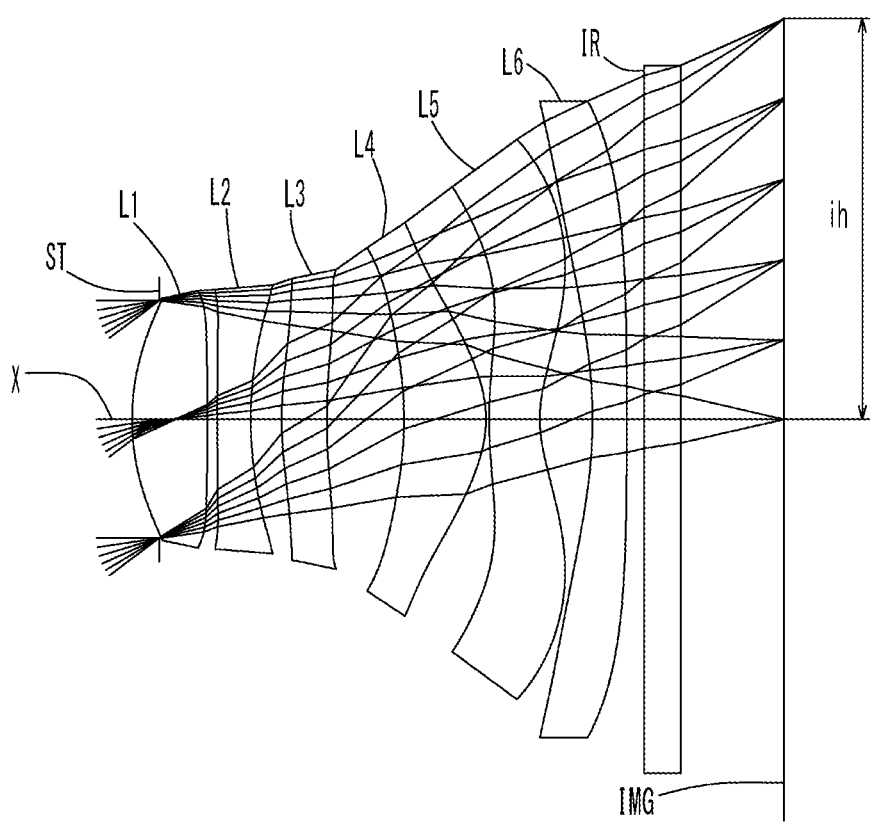
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

In Example 2, total track length TLA is 3.66 mm and TLA/(2ih) is 0.797, which suggests that the imaging lens is low-profile though it uses six constituent lenses. Also, the imaging lens offers a wide field of view of 70 degrees or more and high brightness with an F-value of 2.2.

EXAMPLE 3

The basic lens data of Example 3 is shown in Table 5 below.

TABLE 5

Example 3
in mm
f = 3.04
Fno = 2.2
ω(°) = 37.0
ih = 2.30
TLA = 3.66
bf = 0.83

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | -0.155 | | |
| 2* | 1.3713 | 0.431 | 1.544 | 55.57 |
| 3* | -90.0000 | 0.058 | | |
| 4* | 14.5069 | 0.190 | 1.635 | 23.91 |
| 5* | 1.9120 | 0.177 | | |
| 6* | 1.9527 | 0.258 | 1.535 | 56.16 |
| 7* | 3.1512 | 0.443 | | |
| 8* | -2.0531 | 0.470 | 1.544 | 55.57 |
| 9* | -0.6543 | 0.017 | | |
| 10* | 2.5456 | 0.290 | 1.535 | 56.16 |
| 11* | 0.7499 | 0.302 | | |
| 12* | -2.7105 | 0.195 | 1.535 | 56.16 |
| 13* | -88.9484 | 0.100 | | |
| 14 | Infinity | 0.210 | 1.517 | 64.20 |
| 15 | Infinity | 0.592 | | |
| Image Plane | Infinity | | | |

Constituent Lens Data

| Lens | Start Surface | Focal Length |
|---|---|---|
| 1 | 2 | 2.488 |
| 2 | 4 | -3.489 |
| 3 | 6 | 8.934 |
| 4 | 8 | 1.579 |
| 5 | 10 | -2.107 |
| 6 | 12 | -5.233 |

Aspheric Surface Data

| | 2nd Surface | 3rd Surface | 4th Surface | 5th Surface | 6th Surface | 7th Surface |
|---|---|---|---|---|---|---|
| k | 5.659E-01 | 0.000E+00 | 0.000E+00 | -2.162E+01 | 0.000E+00 | 0.000E+00 |
| A4 | -4.803E-02 | -2.772E-01 | -5.245E-01 | -1.352E-01 | -4.715E-01 | -1.807E-01 |
| A6 | 4.930E-02 | 1.992E+00 | 3.697E+00 | 1.603E+00 | 4.522E-01 | -5.912E-03 |
| A8 | -6.383E-01 | -7.914E+00 | -1.223E+01 | -4.061E+00 | -6.013E-01 | -2.470E-01 |
| A10 | 8.364E-01 | 1.780E+01 | 2.417E+01 | 5.862E+00 | 1.127E+00 | 4.863E-01 |
| A12 | 9.253E-01 | -2.560E+01 | -3.265E+01 | -6.945E+00 | -8.323E-01 | 0.000E+00 |
| A14 | -2.960E+00 | 1.558E+01 | 2.091E+01 | 4.410E+00 | 0.000E+00 | 0.000E+00 |
| A16 | 0.000E+00 | 0.000E+00 | 0.000E+00 | 0.000E+00 | 0.000E+00 | 0.000E+00 |

TABLE 5-continued

Example 3
in mm
f = 3.04
Fno = 2.2
ω(°) = 37.0
ih = 2.30
TLA = 3.66
bf = 0.83

|     | 8th Surface | 9th Surface | 10th Surface | 11th Surface | 12th Surface | 13th Surface |
|-----|-------------|-------------|--------------|--------------|--------------|--------------|
| k   | 0.000E+00   | −4.486E+00  | 0.000E+00    | −8.657E+00   | 0.000E+00    | 0.000E+00    |
| A4  | 1.240E−01   | −2.468E−01  | −3.354E−01   | −2.095E−01   | 6.702E−02    | −1.832E−02   |
| A6  | −5.705E−03  | 3.425E−01   | 7.921E−02    | 1.026E−01    | −1.109E−02   | 2.848E−03    |
| A8  | −4.473E−02  | −1.684E−01  | 2.146E−02    | −4.281E−02   | −2.811E−04   | −1.247E−03   |
| A10 | −1.349E−01  | 9.524E−02   | −1.326E−02   | 1.400E−02    | 2.589E−04    | 1.156E−04    |
| A12 | 1.001E−01   | −6.590E−02  | 3.203E−03    | −3.099E−03   | 0.000E+00    | 0.000E+00    |
| A14 | 0.000E+00   | 1.428E−02   | −9.607E−04   | 2.889E−04    | 0.000E+00    | 0.000E+00    |
| A16 | 0.000E+00   | 0.000E+00   | 0.000E+00    | 0.000E+00    | 0.000E+00    | 0.000E+00    |

As shown in Table 6 below, the imaging lens in Example 3 satisfies all the conditional expressions (1) to (11).

TABLE 6

| (1) $0.5 < f1/f < 1.5$ | | 0.82 |
| (2) $-2.0 < f2/f < -0.5$ | | −1.15 |
| (3) $0.3 < f4/f < 1.0$ | | 0.52 |
| (4) $-1.5 < f5/f < -0.3$ | | −0.69 |
| (5) $-3.0 < f6/f < -0.8$ | | −1.72 |
| (6) $0.3 < r4/f < 1.0$ | | 0.63 |
| (7) $20 < vd1 - vd2 < 50$ | | 31.66 |
| (8) $50 < vd3, vd4, vd5, vd6 < 80$ | vd3 | 56.16 |
| | vd4 | 55.57 |
| | vd5 | 56.16 |
| | vd6 | 56.16 |

TABLE 6-continued

| (9) $1.0 < (r9 + r10)/(r9 - r10) < 2.7$ | 1.84 |
| (10) $-1.5 < (r11 + r12)/(r11 - r12) < -0.5$ | −1.06 |
| (11) $0.3 < f4/f1 < 1.5$ | 0.63 |

Figure 6:
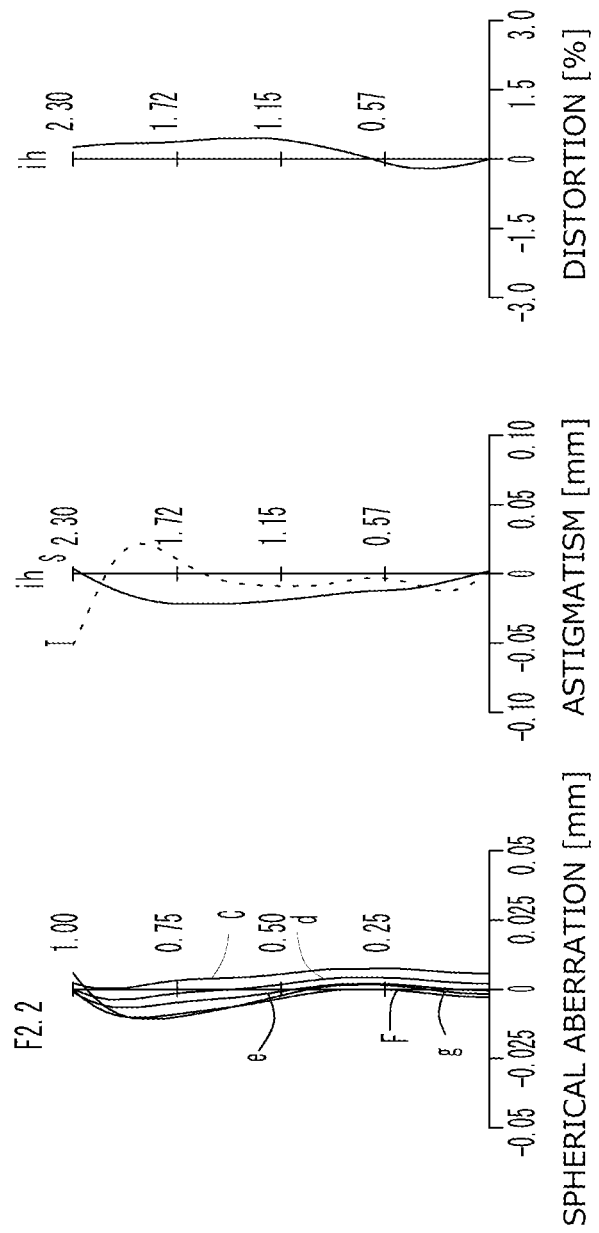
FIG. 6 shows spherical aberration, astigmatism, and distortion of the imaging lens in Example 3.
Figure 7:
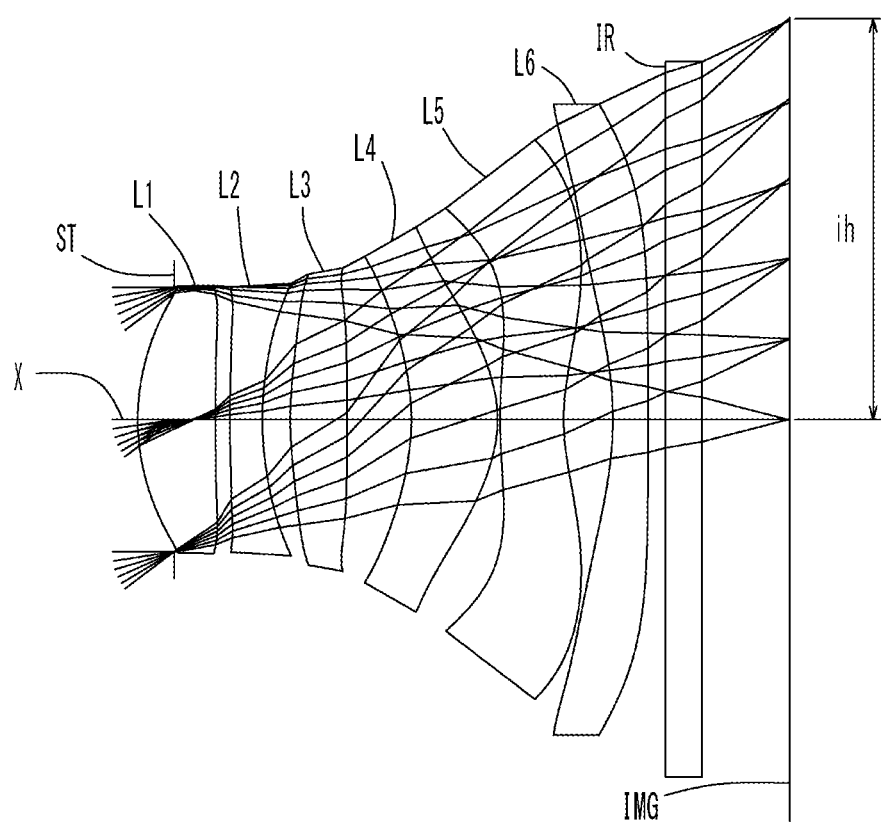
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In Example 3, total track length TLA is 3.66 mm and TLA/(2ih) is 0.797, which suggests that the imaging lens is low-profile though it uses six constituent lenses. Also, the imaging lens offers a wide field of view of 70 degrees or more and high brightness with an F-value of 2.2.

EXAMPLE 4

The basic lens data of Example 4 is shown in Table 7 below.

TABLE 7

Example 4
in mm
f = 3.03
Fno = 2.0
ω(°) = 37.0
ih = 2.30
TLA = 3.66
bf = 0.74

Surface Data

| Surface No. i | Curvature Radius r | Surface Distance d | Refractive Index Nd | Abbe Number vd |
|---------------|--------------------|--------------------|---------------------|----------------|
| (Object Surface) | Infinity | Infinity | | |
| 1 (Stop) | Infinity | −0.208 | | |
| 2* | 1.3099 | 0.444 | 1.544 | 55.57 |
| 3* | 9.4262 | 0.084 | | |
| 4* | 5.6960 | 0.185 | 1.635 | 23.91 |
| 5* | 1.6352 | 0.161 | | |
| 6* | 2.2921 | 0.324 | 1.535 | 56.16 |
| 7* | −90.0000 | 0.368 | | |
| 8* | −1.4058 | 0.493 | 1.544 | 55.57 |
| 9* | −0.7785 | 0.015 | | |
| 10* | 3.1233 | 0.364 | 1.535 | 56.16 |
| 11* | 1.2069 | 0.282 | | |

TABLE 7-continued

Example 4
in mm
f = 3.03
Fno = 2.0
ω(°) = 37.0
ih = 2.30
TLA = 3.66
bf = 0.74

| | | | | |
|---|---|---|---|---|
| 12* | −1.9909 | 0.202 | 1.535 | 56.16 |
| 13* | −90.0000 | 0.100 | | |
| 14 | Infinity | 0.210 | 1.517 | 64.20 |
| 15 | Infinity | 0.499 | | |
| Image Plane | Infinity | | | |

Constituent Lens Data

| Lens | Start Surface | Focal Length |
|---|---|---|
| 1 | 2 | 2.745 |
| 2 | 4 | −3.677 |
| 3 | 6 | 4.186 |
| 4 | 8 | 2.513 |
| 5 | 10 | −3.940 |
| 6 | 12 | −3.811 |

Aspheric Surface Data

| | 2nd Surface | 3rd Surface | 4th Surface | 5th Surface | 6th Surface | 7th Surface |
|---|---|---|---|---|---|---|
| k | 1.449E+00 | 0.000E+00 | 0.000E+00 | −1.687E+01 | 0.000E+00 | 0.000E+00 |
| A4 | −1.184E−01 | −3.190E−01 | −6.755E−01 | −1.772E−01 | −3.241E−01 | −8.044E−02 |
| A6 | 1.481E−01 | 2.059E+00 | 3.825E+00 | 1.703E+00 | 4.171E−01 | 2.924E−02 |
| A8 | −9.474E−01 | −7.415E+00 | −1.175E+01 | −3.927E+00 | −6.590E−01 | −3.955E−01 |
| A10 | 9.585E−01 | 1.734E+01 | 2.402E+01 | 5.926E+00 | 1.271E+00 | 5.636E−01 |
| A12 | 9.423E−01 | −2.544E+01 | −3.313E+01 | −7.209E+00 | −8.058E−01 | 0.000E+00 |
| A14 | −2.839E+00 | 1.524E+01 | 2.035E+01 | 4.510E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −4.031E+00 | 0.000E+00 | −1.351E+01 | 0.000E+00 | 0.000E+00 |
| A4 | 1.995E−01 | −2.473E−01 | −3.320E−01 | −1.637E−01 | 1.394E−01 | −8.075E−03 |
| A6 | −1.690E−01 | 3.123E−01 | 7.333E−02 | 8.341E−02 | −3.010E−02 | −9.692E−03 |
| A8 | 1.705E−01 | −1.793E−01 | −1.069E−02 | −3.566E−02 | −7.976E−04 | 8.946E−04 |
| A10 | −1.021E−01 | 1.159E−01 | −1.693E−02 | 1.200E−02 | 1.262E−03 | 1.651E−04 |
| A12 | 1.693E−03 | −5.390E−02 | 3.760E−03 | −3.468E−03 | 0.000E+00 | 0.000E+00 |
| A14 | 0.000E+00 | 5.944E−03 | 3.890E−03 | 4.640E−04 | 0.000E+00 | 0.000E+00 |
| A16 | 0.000E+00 | 0.000E+00 | 0.000E+00 | 0.000E+00 | 0.000E+00 | 0.000E+00 |

As shown in Table 8 below, the imaging lens in Example 4 satisfies all the conditional expressions (1) to (11).

TABLE 8

| | | | |
|---|---|---|---|
| (1) $0.5 < f1/f < 1.5$ | | | 0.91 |
| (2) $-2.0 < f2/f < -0.5$ | | | -1.21 |
| (3) $0.3 < f4/f < 1.0$ | | | 0.83 |
| (4) $-1.5 < f5/f < -0.3$ | | | -1.30 |
| (5) $-3.0 < f6/f < -0.8$ | | | -1.26 |
| (6) $0.3 < r4/f < 1.0$ | | | 0.54 |
| (7) $20 < vd1 - vd2 < 50$ | | | 31.66 |
| (8) $50 < vd3, vd4, vd5, vd6 < 80$ | | vd3 | 56.16 |
| | | vd4 | 55.57 |
| | | vd5 | 56.16 |
| | | vd6 | 56.16 |

TABLE 8-continued

| | |
|---|---|
| (9) $1.0 < (r9 + r10)/(r9 - r10) < 2.7$ | 2.26 |
| (10) $-1.5 < (r11 + r12)/(r11 - r12) < -0.5$ | -1.05 |
| (11) $0.3 < f4/f1 < 1.5$ | 0.92 |

Figure 8:
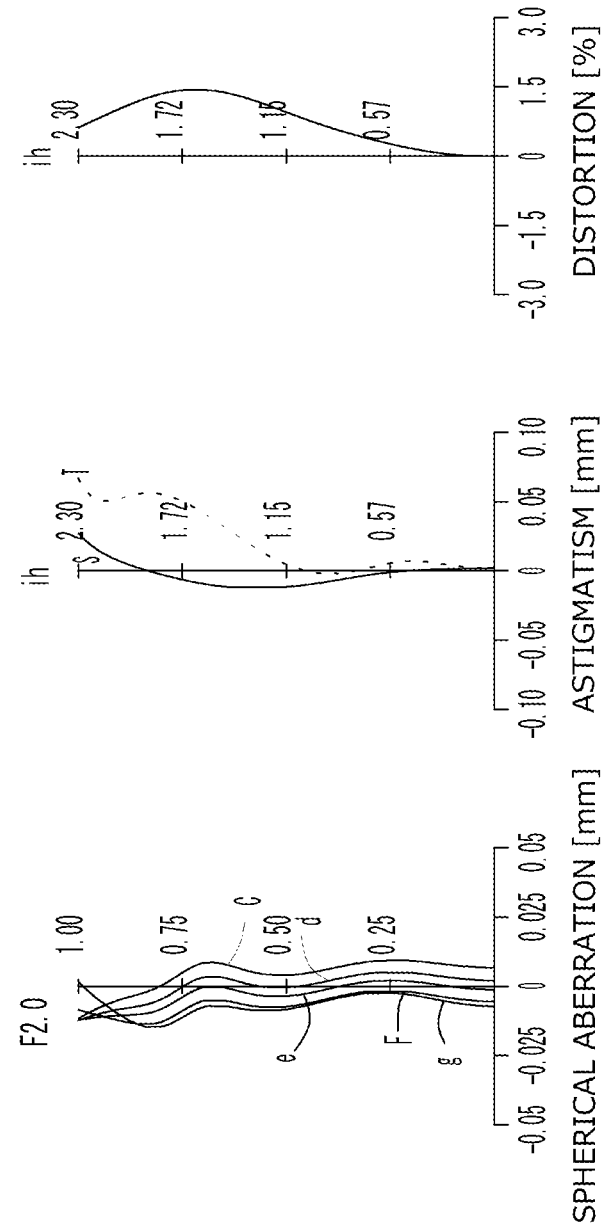
FIG. 8 shows spherical aberration, astigmatism, and distortion of the imaging lens in Example 4.
Figure 9:
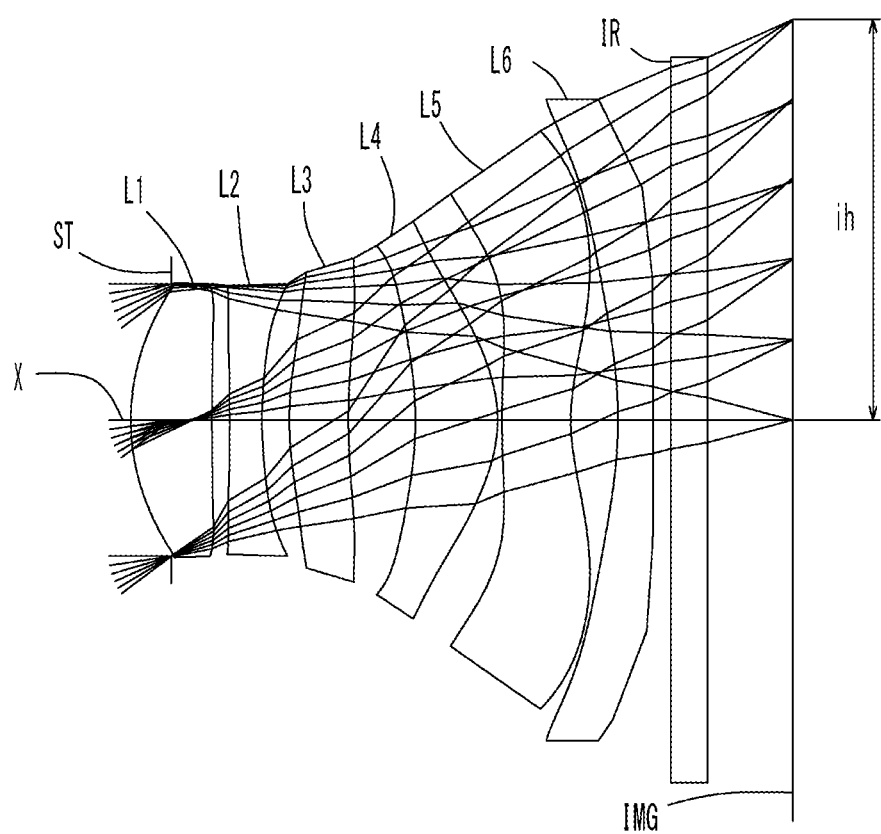
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In Example 4, total track length TLA is 3.35 mm and TLA/(2ih) is 0.797, which suggests that the imaging lens is low-profile though it uses six constituent lenses. Also, the imaging lens offers a wide field of view of 70 degrees or more and high brightness with an F-value of 2.0.

EXAMPLE 5

The basic lens data of Example 5 is shown in Table 9 below.

TABLE 9

Example 5
in mm
f = 3.04
Fno = 1.9
ω(°) = 37.0
ih = 2.30
TLA = 3.72
bf = 0.73

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | -0.231 | | |
| 2* | 1.2919 | 0.464 | 1.544 | 55.57 |
| 3* | 9.5112 | 0.103 | | |
| 4* | -90.0000 | 0.185 | 1.635 | 23.91 |
| 5* | 2.2715 | 0.156 | | |
| 6* | 1.7875 | 0.339 | 1.535 | 56.16 |
| 7* | 3.8841 | 0.384 | | |
| 8* | -2.0461 | 0.470 | 1.544 | 55.57 |
| 9* | -0.7975 | 0.024 | | |
| 10* | 4.0451 | 0.395 | 1.535 | 56.16 |
| 11* | 1.1567 | 0.270 | | |
| 12* | -2.5250 | 0.202 | 1.535 | 56.16 |
| 13* | -90.0000 | 0.100 | | |
| 14 | Infinity | 0.210 | 1.517 | 64.20 |
| 15 | Infinity | 0.488 | | |
| Image Plane | Infinity | | | |

Constituent Lens Data

| Lens | Start Surface | Focal Length |
|---|---|---|
| 1 | 2 | 2.695 |
| 2 | 4 | -3.487 |
| 3 | 6 | 5.864 |
| 4 | 8 | 2.122 |
| 5 | 10 | -3.182 |
| 6 | 12 | -4.863 |

Aspheric Surface Data

| | 2nd Surface | 3rd Surface | 4th Surface | 5th Surface | 6th Surface | 7th Surface |
|---|---|---|---|---|---|---|
| k | 1.180E+00 | 0.000E+00 | 0.000E+00 | -3.988E+01 | 0.000E+00 | 0.000E+00 |
| A4 | -1.189E-01 | -3.300E-01 | -5.911E-01 | -2.267E-01 | -4.740E-01 | -8.678E-02 |
| A6 | 2.084E-01 | 1.925E+00 | 3.735E+00 | 1.949E+00 | 6.112E-01 | -3.541E-02 |
| A8 | -9.278E-01 | -7.145E+00 | -1.145E+01 | -3.987E+00 | -8.311E-01 | -1.616E-01 |
| A10 | 6.950E-01 | 1.754E+01 | 2.427E+01 | 5.951E+00 | 1.093E+00 | 1.946E-01 |
| A12 | 1.182E+00 | -2.488E+01 | -3.306E+01 | -7.638E+00 | -6.223E-01 | 0.000E+00 |
| A14 | -2.285E+00 | 1.377E+01 | 1.911E+01 | 4.844E+00 | 0.000E+00 | 0.000E+00 |
| A16 | 0.000E+00 | 0.000E+00 | 0.000E+00 | 0.000E+00 | 0.000E+00 | 0.000E+00 |

TABLE 9-continued

Example 5
in mm
f = 3.04
Fno = 1.9
ω(°) = 37.0
ih = 2.30
TLA = 3.72
bf = 0.73

|     | 8th Surface | 9th Surface | 10th Surface | 11th Surface | 12th Surface | 13th Surface |
|-----|-------------|-------------|--------------|--------------|--------------|--------------|
| k   | 0.000E+00   | −4.078E+00  | 0.000E+00    | −1.128E+01   | 0.000E+00    | 0.000E+00    |
| A4  | 1.671E−01   | −2.140E−01  | −2.927E−01   | −1.802E−01   | 1.015E−01    | 6.482E−03    |
| A6  | −7.483E−02  | 2.619E−01   | 4.191E−02    | 9.498E−02    | −3.208E−02   | −1.679E−02   |
| A8  | −1.059E−02  | −1.652E−01  | 1.193E−02    | −3.941E−02   | 1.555E−03    | 1.870E−03    |
| A10 | −1.642E−02  | 1.248E−01   | 1.096E−03    | 1.247E−02    | 5.870E−04    | 8.060E−05    |
| A12 | −2.668E−02  | −6.201E−02  | 4.432E−03    | −3.131E−03   | 0.000E+00    | 0.000E+00    |
| A14 | 0.000E+00   | 8.068E−03   | −2.367E−03   | 3.715E−04    | 0.000E+00    | 0.000E+00    |
| A16 | 0.000E+00   | 0.000E+00   | 0.000E+00    | 0.000E+00    | 0.000E+00    | 0.000E+00    |

As shown in Table 10 below, the imaging lens in Example 5 satisfies all the conditional expressions (1) to (11).

TABLE 10

| (1) 0.5 < f1/f < 1.5 | 0.89 | | |
| (2) −2.0 < f2/f < −0.5 | −1.15 | | |
| (3) 0.3 < f4/f < 1.0 | 0.70 | | |
| (4) −1.5 < f5/f < −0.3 | −1.05 | | |
| (5) −3.0 < f6/f < −0.8 | −1.60 | | |
| (6) 0.3 < r4/f < 1.0 | 0.75 | | |
| (7) 20 < vd1 − vd2 < 50 | 31.66 | | |
| (8) 50 < vd3, vd4, vd5, vd6 < 80 | | vd3 | 56.16 |
| | | vd4 | 55.57 |
| | | vd5 | 56.16 |
| | | vd6 | 56.16 |

TABLE 10-continued

| (9) 1.0 < (r9 + r10)/(r9 − r10) < 2.7 | 1.80 |
| (10) −1.5 < (r11 + r12)/(r11 − r12) < −0.5 | −1.06 |
| (11) 0.3 < f4/f1 < 1.5 | 0.79 |

Figure 10:
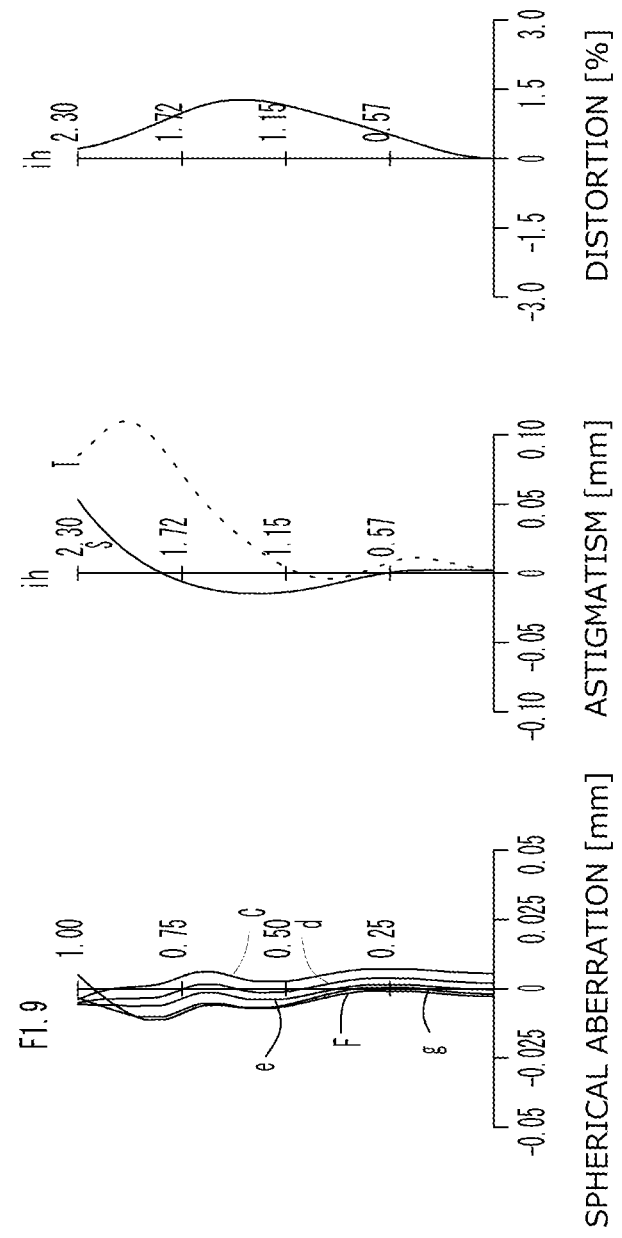
FIG. 10 shows spherical aberration, astigmatism, and distortion of the imaging lens in Example 5.
Figure 11:
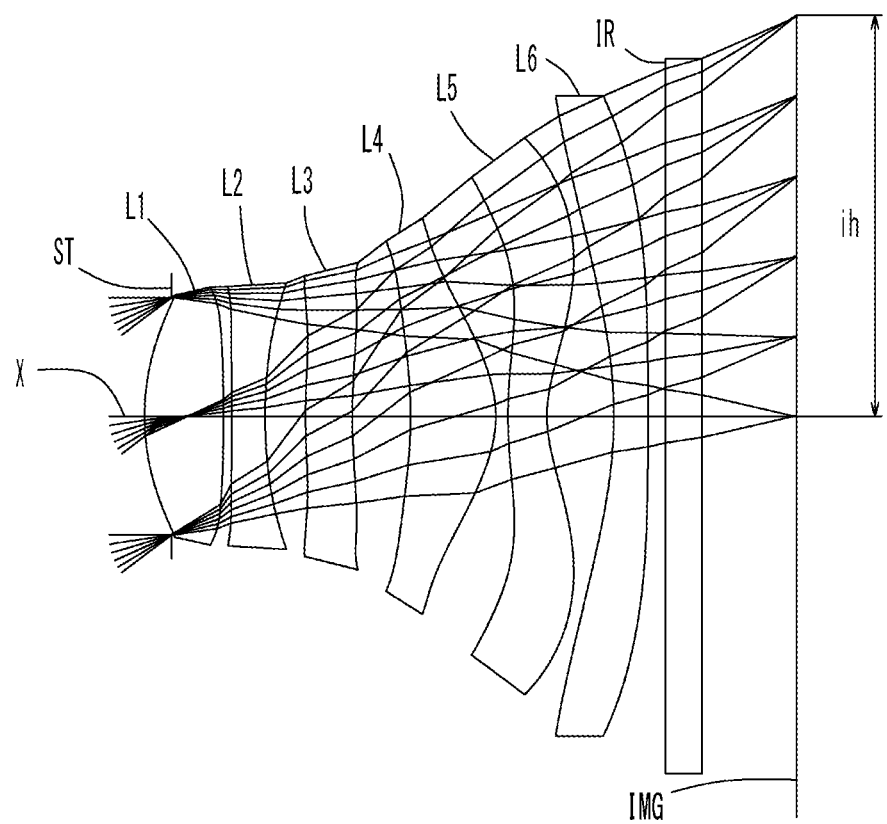
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

In Example 5, total track length TLA is 3.72 mm and TLA/(2ih) is 0.809, which suggests that the imaging lens is low-profile though it uses six constituent lenses. Also, the imaging lens offers a wide field of view of 70 degrees or more and high brightness with an F-value of 1.9.

EXAMPLE 6

The basic lens data of Example 6 is shown in Table 11 below.

TABLE 11

Example 6
in mm
f = 3.06
Fno = 2.2
ω(°) = 37.0
ih = 2.30
TLA = 3.66
bf = 0.78

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.155 | | |
| 2* | 1.3625 | 0.452 | 1.544 | 55.57 |
| 3* | −14.0759 | 0.048 | | |
| 4* | 50.5761 | 0.190 | 1.635 | 23.91 |
| 5* | 2.3830 | 0.232 | | |
| 6* | 3.6079 | 0.268 | 1.535 | 56.16 |
| 7* | 3.4000 | 0.333 | | |
| 8* | −2.6281 | 0.488 | 1.544 | 55.57 |
| 9* | −0.6567 | 0.069 | | |
| 10* | 2.4230 | 0.223 | 1.535 | 56.16 |
| 11* | 0.7360 | 0.383 | | |
| 12* | −2.5616 | 0.195 | 1.535 | 56.16 |
| 13* | −80.3679 | 0.100 | | |
| 14 | Infinity | 0.210 | 1.517 | 64.20 |
| 15 | Infinity | 0.542 | | |
| Image Plane | Infinity | | | |

TABLE 11-continued

Example 6
in mm
f = 3.06
Fno = 2.2
ω(°) = 37.0
ih = 2.30
TLA = 3.66
bf = 0.78

Constituent Lens Data

| Lens | Start Surface | Focal Length |
|---|---|---|
| 1 | 2 | 2.308 |
| 2 | 4 | −3.945 |
| 3 | 6 | −200.330 |
| 4 | 8 | 1.481 |
| 5 | 10 | −2.073 |
| 6 | 12 | −4.954 |

Aspheric Surface Data

| | 2nd Surface | 3rd Surface | 4th Surface | 5th Surface | 6th Surface | 7th Surface |
|---|---|---|---|---|---|---|
| k | 5.529E−01 | 0.000E+00 | 0.000E+00 | −2.644E+01 | 0.000E+00 | 0.000E+00 |
| A4 | −4.475E−02 | −3.264E−01 | −5.312E−01 | −1.288E−01 | −4.876E−01 | −2.565E−01 |
| A6 | 2.530E−02 | 2.073E+00 | 3.695E+00 | 1.594E+00 | 4.384E−01 | 1.183E−01 |
| A8 | −5.731E−01 | −7.936E+00 | −1.211E+01 | −3.988E+00 | −4.459E−01 | −2.816E−01 |
| A10 | 7.221E−01 | 1.776E+01 | 2.411E+01 | 5.913E+00 | 1.118E+00 | 4.144E−01 |
| A12 | 9.255E−01 | −2.560E+01 | −3.265E+01 | −6.945E+00 | −8.321E−01 | 0.000E+00 |
| A14 | −2.960E+00 | 1.558E+01 | 2.091E+01 | 4.410E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −4.677E+00 | 0.000E+00 | −8.073E+00 | 0.000E+00 | 0.000E+00 |
| A4 | 1.650E−01 | −2.263E−01 | −3.285E−01 | −2.039E−01 | 5.874E−02 | −3.244E−02 |
| A6 | −6.893E−02 | 3.482E−01 | 7.124E−02 | 9.629E−02 | −8.311E−02 | 6.388E−03 |
| A8 | −4.220E−03 | −1.691E−01 | 1.991E−02 | −4.098E−02 | 1.666E−04 | −1.115E−03 |
| A10 | −8.912E−02 | 9.138E−02 | −1.178E−02 | 1.397E−02 | 1.675E−04 | 7.448E−05 |
| A12 | 5.659E−02 | −6.628E−02 | 3.772E−03 | −3.311E−03 | 0.000E+00 | 0.000E+00 |
| A14 | 0.000E+00 | 1.613E−02 | −1.021E−03 | 3.329E−04 | 0.000E+00 | 0.000E+00 |
| A16 | 0.000E+00 | 0.000E+00 | 0.000E+00 | 0.000E+00 | 0.000E+00 | 0.000E+00 |

As shown in Table 12 below, the imaging lens in Example 6 satisfies all the conditional expressions (1) to (11).

TABLE 12

| | | |
|---|---|---|
| (1) $0.5 < f1/f < 1.5$ | | 0.76 |
| (2) $-2.0 < f2/f < -0.5$ | | −1.29 |
| (3) $0.3 < f4/f < 1.0$ | | 0.48 |
| (4) $-1.5 < f5/f < -0.3$ | | −0.68 |
| (5) $-3.0 < f6/f < -0.8$ | | −1.62 |
| (6) $0.3 < r4/f < 1.0$ | | 0.78 |
| (7) $20 < vd1 - vd2 < 50$ | | 31.66 |
| (8) $50 < vd3, vd4, vd5, vd6 < 80$ | vd3 | 56.16 |
| | vd4 | 55.57 |
| | vd5 | 56.16 |
| | vd6 | 56.16 |
| (9) $1.0 < (r9 + r10)/(r9 - r10) < 2.7$ | | 1.87 |
| (10) $-1.5 < (r11 + r12)/(r11 - r12) < -0.5$ | | −1.07 |
| (11) $0.3 < f4/f1 < 1.5$ | | 0.64 |

Figure 12:
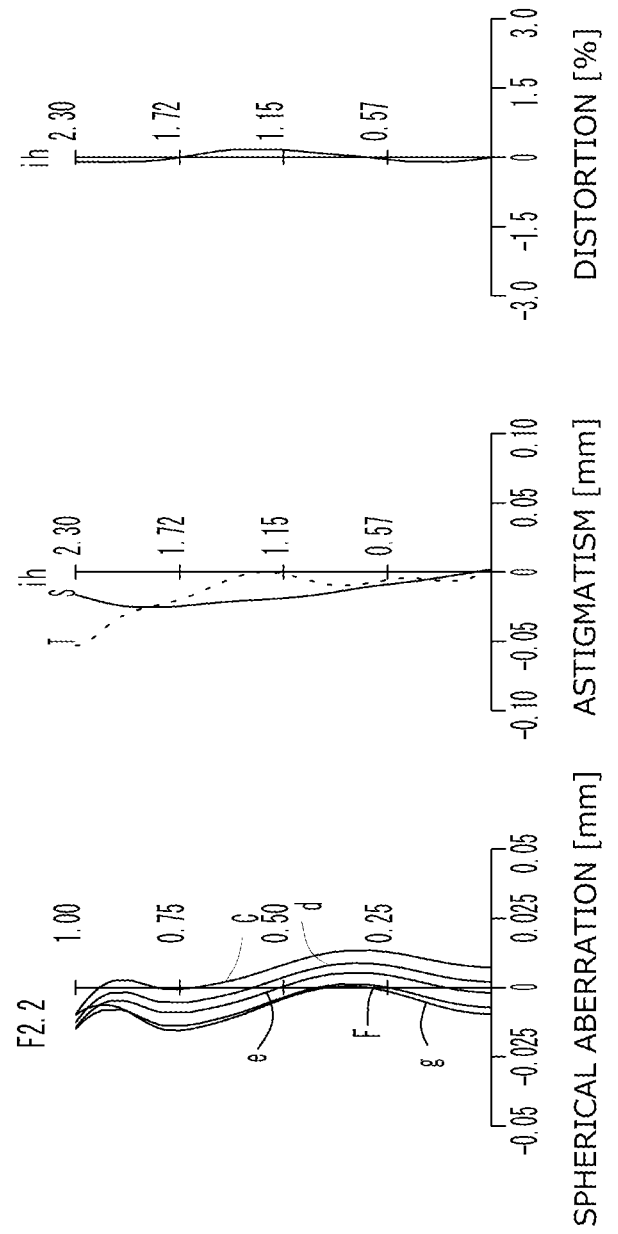
FIG. 12 shows spherical aberration, astigmatism, and distortion of the imaging lens in Example 6.

FIG. 12 shows spherical aberration (mm), astigmatism (mm), and distortion (%) of the imaging lens in Example 6. As shown in FIG. 12, each aberration is corrected properly.

In Example 6, total track length TLA is 3.66 mm and TLA/(2ih) is 0.797, which suggests that the imaging lens is low-profile though it uses six constituent lenses. Also, the imaging lens offers a wide field of view of 70 degrees or more and high brightness with an F-value of 2.2.

As explained above, the imaging lenses according to the Examples of the present invention are low-profile enough to meet the growing demand for low-profileness, with total track length TLA of 4.0 mm or less and a ratio of total track length TLA to maximum image height ih (TLA/2ih) of about 0.8, though they use six constituent lenses. In addition, these imaging lenses offer a wide field of view of 70 degrees or more and high brightness with an F-value of 1.9 to 2.2, correct aberrations properly and feature low cost.

When any one of the imaging lenses composed of six constituent lenses according to the Examples of the present invention is used for an optical system built in an image pickup device mounted in an increasingly compact and low-profile mobile terminal such as a smartphone, mobile phone or PDA (Personal Digital Assistant), or a game console or an information terminal such as a PC, or a home appliance with a camera function, it contributes to the compactness of the image pickup device and offers high camera performance.

The effects of the present invention are as follows.

According to the present invention, it is possible to provide a compact low-cost imaging lens which offers brightness with an F-value of 2.5 or less and a wide field of view and corrects various aberrations properly, meeting the demand for low-profileness.

What is claimed is:

1. An imaging lens which forms an image of an object on a solid-state image sensor, in which elements are arranged in order from an object side to an image side, comprising:
   a first lens with positive refractive power having a convex surface on the object side;
   a second lens with negative refractive power;

a third lens with positive or negative refractive power having at least one aspheric surface;
a fourth lens with positive refractive power;
a fifth lens as a meniscus double-sided aspheric lens having a concave surface near an optical axis on the image side; and
a sixth lens as a meniscus lens having a concave surface near the optical axis on the object side,
wherein both surfaces of the fifth lens have pole-change points off the optical axis, and
wherein a conditional expression (5) below is satisfied:

$$-3.0 < f6/f < -0.8 \qquad (5)$$

where
f: focal length of an overall optical system of the imaging lens
f6: focal length of the sixth lens.

2. The imaging lens according to claim 1,
wherein a conditional expression (1) below is satisfied:

$$0.5 < f1/f < 1.5 \qquad (1)$$

where
f: focal length of an overall optical system of the imaging lens
f1: focal length of the first lens.

3. The imaging lens according to claim 2,
wherein a conditional expression (2) below is satisfied:

$$-2.0 < f2/f < -0.5 \qquad (2)$$

where
f: focal length of an overall optical system of the imaging lens
f2: focal length of the second lens.

4. The imaging lens according to claim 2,
wherein a conditional expression (3) below is satisfied:

$$0.3 < f4/f < 1.0 \qquad (3)$$

where
f: focal length of an overall optical system of the imaging lens
f4: focal length of the fourth lens.

5. The imaging lens according to claim 2,
wherein a conditional expression (4) below is satisfied:

$$-1.5 < f5/f < -0.3 \qquad (4)$$

where
f: focal length of an overall optical system of the imaging lens
f5: focal length of the fifth lens.

6. The imaging lens according to claim 2,
wherein a conditional expression (5) below is satisfied:

$$-3.0 < f6/f < -0.8 \qquad (5)$$

where
f: focal length of an overall optical system of the imaging lens
f6: focal length of the sixth lens.

7. The imaging lens according to claim 2,
wherein a conditional expression (11) below is satisfied:

$$0.3 < f4/f1 < 1.5 \qquad (11)$$

where
f1: focal length of the first lens
f4: focal length of the fourth lens.

8. The imaging lens according to claim 1,
wherein a conditional expression (2) below is satisfied:

$$-2.0 < f2/f < -0.5 \qquad (2)$$

where
f: focal length of an overall optical system of the imaging lens
f2: focal length of the second lens.

9. The imaging lens according to claim 1,
wherein a conditional expression (3) below is satisfied:

$$0.3 < f4/f < 1.0 \qquad (3)$$

where
f: focal length of an overall optical system of the imaging lens
f4: focal length of the fourth lens.

10. The imaging lens according to claim 1,
wherein a conditional expression (4) below is satisfied:

$$-1.5 < f5/f < -0.3 \qquad (4)$$

where
f: focal length of an overall optical system of the imaging lens
f5: focal length of the fifth lens.

11. The imaging lens according to claim 1,
wherein the third lens has a meniscus shape with a convex surface near the optical axis on the object side.

12. The imaging lens according to claim 1,
wherein a conditional expression (6) below is satisfied:

$$0.3 < r4/f < 1.0 \qquad (6)$$

where
f: focal length of an overall optical system of the imaging lens
r4: curvature radius of the image-side surface of the second lens.

13. The imaging lens according to claim 1,
wherein conditional expressions (7) and (8) below are satisfied:

$$20 < vd1 - vd2 < 50 \qquad (7)$$

$$50 < vd3, vd4, vd5, vd6 < 80 \qquad (8)$$

where
vd1: Abbe number of the first lens at d-ray
vd2: Abbe number of the second lens at d-ray
vd3: Abbe number of the third lens at d-ray
vd4: Abbe number of the fourth lens at d-ray
vd5: Abbe number of the fifth lens at d-ray
vd6: Abbe number of the sixth lens at d-ray.

14. The imaging lens according to claim 1,
wherein conditional expressions (9) and (10) below are satisfied:

$$1.0 < (r9+r10)/(r9-r10) < 2.7 \qquad (9)$$

$$-1.5 < (r11+r12)/(r11-r12) < -0.5 \qquad (10)$$

where
r9: curvature radius of the object-side surface of the fifth lens
r10: curvature radius of the image-side surface of the fifth lens
r11: curvature radius of the object-side surface of the sixth lens
r12: curvature radius of the image-side surface of the sixth lens.

15. The imaging lens according to claim 1,
wherein a conditional expression (11) below is satisfied:

$$0.3 < f4/f1 < 1.5 \tag{11}$$

where
f1: focal length of the first lens
f4: focal length of the fourth lens.

\* \* \* \* \*